Jan. 2, 1945. T. ABRAMS ET AL 2,366,228
OPTICAL INSTRUMENT
Filed Dec. 30, 1942
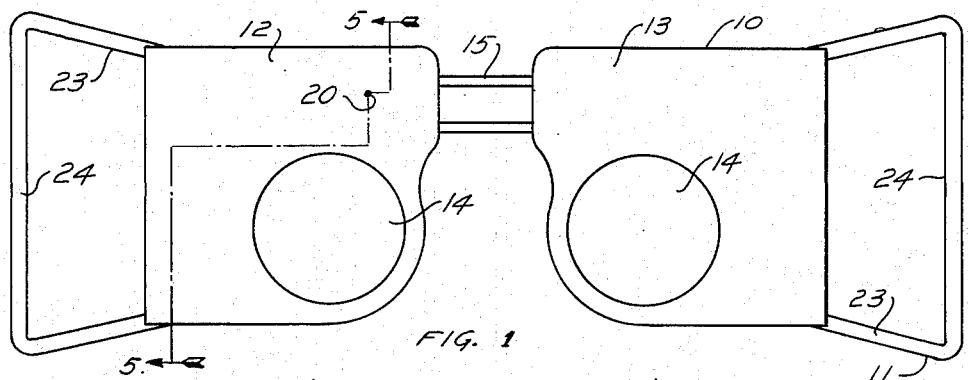
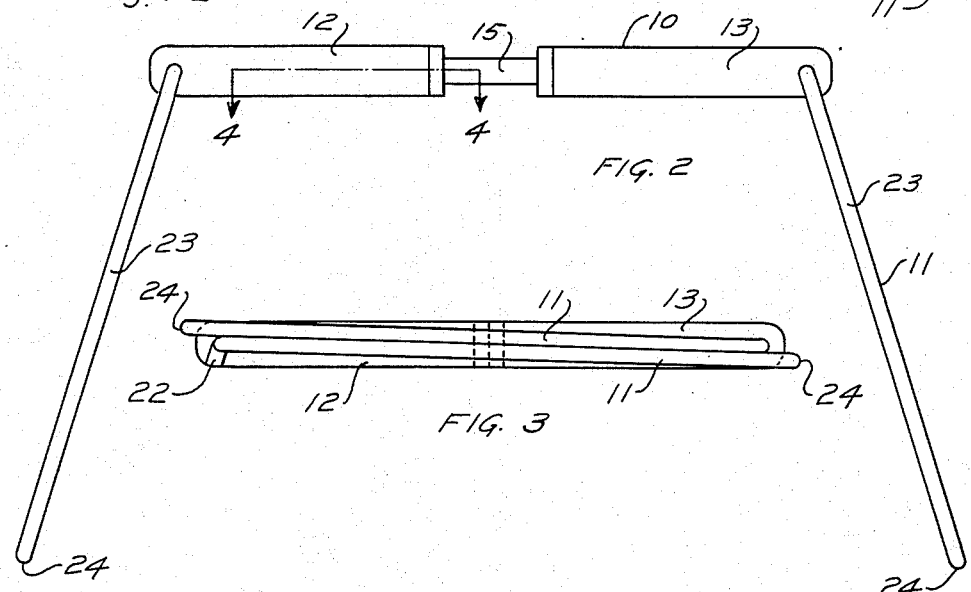
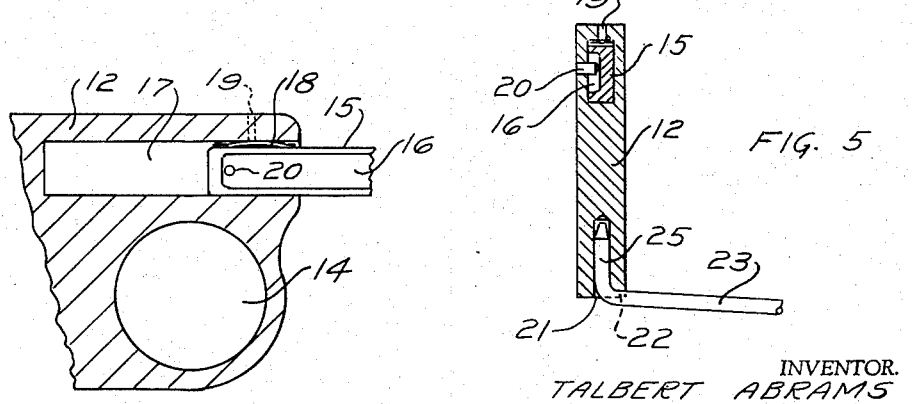
INVENTOR.
TALBERT ABRAMS
MILFORD B. MOORE
BY WILLIAM S. KARR Patented Jan. 2, 1945

2,366,228

UNITED STATES PATENT OFFICE 2,366,228

OPTICAL INSTRUMENT

Talbert Abrams, Milford B. Moore, and William S. Karr, Lansing, Mich., assignors to Talbert Abrams, doing business as Abrams Instrument Company, Lansing, Mich.

Application December 30, 1942, Serial No. 470,536

2 Claims. (Cl. 88—29)

This invention relates to optical instruments, and more particularly to stereoscopes.

The principal object of the invention is to provide an optical instrument adapted to be opened into erect position when in use and folded into a neat compact package when not in use.

Another object of the invention is to provide a stereoscope in which the inter-pupillary distance of the lenses can be easily varied.

A still further object of the invention is to provide a folding optical instrument comprising a lens carrying frame and a pair of standards therefor in which the frame is provided with means for automatically latching the standards in erect position.

For a more detailed description of the invention, reference is made to the accompanying drawing, wherein—

Figure 1 is a plan view of a stereoscope embodying the invention, the same being shown in erect position;

For a more detailed description of the invention, reference is made to the accompanying drawing, wherein—

Figure 1 is a plan view of a stereoscope embodying the invention, the same being shown in erect position;

Figure 2 is a front elevational view of the stereoscope in erect position.

Figure 3 is a front elevational view of a stereoscope in its folded position;

Figure 4 is a fragmentary cross-sectional view taken on substantially the line 4—4 of Figure 2; and Figure 5 is a fragmentary cross-sectional view taken on substantially the line 5—5 of Figure 1.

Referring now to the drawing in more detail, the invention is disclosed as embodied in a folding stereoscope comprising in general a lens carrying frame 10 and a pair of standards 11 pivotally connected thereto. The standards are adapted to support the frame at a fixed distance from a pair of stereoscopic views when the device is in use.

The frame 10 is composed of two separate sections 12 and 13 of similar configuration. Each section has an opening therein in which a lens 14 is secured in any suitable manner.

The two sections 12 and 13 of the frame are connected together so as to be capable of limited separation whereby the distance between the lenses may be varied to provide for variations in the spacing of the eyes of different users. Secured to one of the sections of the frame (in the present instance section 13) is an elongated guide bar 15. The guide bar is of generally rectangular cross-section and is provided with an elongated recess 16 in the upper surface thereof (see Figures 4 and 5). In the other section 12 of the frame is a relatively deep hole 17 to receive the guide bar 15. The hole 17 is slightly wider than the width of the guide bar 15. A leaf spring 18 is held in the hole 17 adjacent one side thereof to resiliently engage a side of the guide bar 15. The spring 18 is held in place by a pin 19 extending through one side of a wall of the hole 17 in the section 12. The spring 18 maintains alignment of the guide bar in the hole 17 by pressing the guide bar against the opposite wall of said hole. At the same time the spring acts as a frictional detent to hold the guide bar 15 in any position of adjustment. A pin 20 extends down through the top wall of the frame into the recess 16 in the top of the guide bar and prevents complete withdrawal of the guide bar from the section 12 of the frame.

As will be evident from the foregoing description and the accompanying drawing, the two sections 12 and 13 of the frame can be pulled apart to the extent determined by the pin 20 or can be pushed together until the two sections abut each other, as shown in Figure 3. Thus, it is possible to vary the inter-pupillary distances of the lens 14 to fit the eyes of the user of the instrument.

In opposite sides of each of the sections 12 and 13 adjacent the ends thereof are cylindrical sockets 21. The sockets are arranged in pairs adjacent the ends of the frame, and the sockets of each pair are axially aligned with each other. Four grooves 22 are formed in the sides of the frame, one adjacent each of the sockets 21 and intersecting the same. The grooves on each side of the frame are inclined slightly and diverge downwardly. The sides of the grooves form spaced apart shoulders for a purpose which will appear presently.

The standards 11 are formed from cylindrical bar or wire stock. Each standard is formed from one piece of material bent into the configuration shown in Figures 1, 2 and 5. Each standard is generally U-shaped and comprises a base or web 24, and a pair of legs 23. The legs 23 converge toward each other from the base 24. The free ends of the legs 23 are bent toward each other to form portions 25 which are in axial alignment. The portions 25 are received in the sockets 21 in the sides of the frame. The standards 11 are flexible to permit the separation of the free ends so that the portions 25 can be inserted in the sockets. The inherent resiliency of the legs of the standards causes them to spring toward each other when released to prevent accidental displacement of the portions 25 from the sockets. It also causes the legs 23 to snap into the grooves 22 when the standards are moved to an erect position, as shown in Figures 1 and 2.

The lengths of the standards, or in other words, the distance between the portions 25 and the bases 24 is just enough greater than the length of the frame when the two sections are contacting each other so that the bases 24 can be swung to overlap the ends of the frame and lie wholly within the thickness thereof (see Figure 3). Thus, the entire device can be folded into a compact package which is no thicker than the thickness of the frame itself. The length and width of the folded stereoscope are greater than the length and width respectively of the frame itself by only twice the diameter of the stock which forms the standards 11.

To set up the stereoscope it is unfolded from the position shown in Figure 3 by pivoting the standards about the portions 25 until the legs 23 snap into the grooves 22. The two parts of the frame are then separated the required distance. To use the stereoscope, the two stereoscopic photographs which are to be viewed are fastened to a drawing board or similar flat surface in proper relationship to each other. The stereoscope is then set up on the two views with the bases 24 of the standards resting thereon. The stereoscope can readily be moved about over the two views so that the entire area thereof can be covered.

From the foregoing it will be seen that this invention provides a stereoscope which is capable of ready adjustment for use, but which can be folded when not in use into a very small compass for ease in carrying. The device is simple and of rugged construction.

The scope of the invention is indicated in the appended claims.

1. A folding stereoscope comprising an eye piece assembly including two lens holding members, means for slidably connecting said members together in coplonar relationship for movement between extended and contracted positions, and a pair of standards pivotally connected to said assembly adjacent the ends thereof remote from each other for pivotal movement between erect frame supporting position and folded position wherein they lie in the plane of the assembly, said standards having portions at their free ends adapted to hook over said remote ends of the assembly when the latter is in its contracted position to hold said assembly in such contracted position.

2. A folding stereoscope as defined in claim 1 wherein said means comprises a projection on one member and a corresponding socket in the other member receiving said projection, and wherein a frictional detent is located in said socket and engageable with said projection.

TALBERT ABRAMS.
MILFORD B. MOORE.
WILLIAM S. KARR.